(12) United States Patent
Kajitani et al.

(10) Patent No.: US 10,010,925 B2
(45) Date of Patent: Jul. 3, 2018

(54) SWAGE APPARATUS AND SWAGE METHOD

(71) Applicant: MITSUBISHI HEAVY INDUSTRIES, LTD., Tokyo (JP)

(72) Inventors: Fumito Kajitani, Tokyo (JP); Hideaki Sakurai, Tokyo (JP); Takahiro Kubota, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 455 days.

(21) Appl. No.: 14/762,352

(22) PCT Filed: Jan. 20, 2014

(86) PCT No.: PCT/JP2014/050885
§ 371 (c)(1),
(2) Date: Jul. 21, 2015

(87) PCT Pub. No.: WO2014/115660
PCT Pub. Date: Jul. 31, 2014

(65) Prior Publication Data
US 2015/0360278 A1    Dec. 17, 2015

(30) Foreign Application Priority Data

Jan. 24, 2013 (JP) .................................. 2013-011302

(51) Int. Cl.
*B21D 39/04* (2006.01)
*B21D 41/02* (2006.01)
(Continued)

(52) U.S. Cl.
CPC ............. *B21D 41/02* (2013.01); *B21D 39/00* (2013.01); *B21D 39/046* (2013.01);
(Continued)

(58) Field of Classification Search
CPC ...... B21D 41/02; B21D 39/046; B21D 39/00; B25B 27/10; F16L 13/146; F16L 33/2076; B23P 19/027
(Continued)

(56) References Cited

U.S. PATENT DOCUMENTS 5,694,670 A * 12/1997 Hosseinian ............ B21D 39/04
29/237
6,430,792 B1    8/2002 Foster et al.
(Continued)

FOREIGN PATENT DOCUMENTS

EP       1729916 A1    12/2006
JP       S60-100165 U   7/1985
(Continued)

OTHER PUBLICATIONS

PCT/IB/338, "Notification of Transmittal of Translation of the International Preliminary Report on Patentability for International Application No. PCT/JP2014/050885," dated Aug. 6, 2015.
(Continued)

*Primary Examiner* — David B Jones
(74) *Attorney, Agent, or Firm* — Manabu Kanesaka; Benjamin Hauptman; Kenneth Berner

(57) ABSTRACT

A swage apparatus includes a main body for supporting a coupling such that an axis of the coupling is oriented in a first direction, a stopper which comes into contact with one member of a first member or a second member of the coupling and restricts the one member from moving in the first direction, a pusher which comes into contact with the other member of the first member or the second member and pushes the other member in the first direction, and a cover member for covering the coupling so as to prevent the axis of the coupling from becoming displaced. The axis can thereby be prevented from becoming displaced.

11 Claims, 9 Drawing Sheets

(51) Int. Cl.
*B21D 39/00* (2006.01)
*B23P 19/027* (2006.01)
*F16L 33/207* (2006.01)
*B25B 27/10* (2006.01)
*F16L 13/14* (2006.01)

(52) U.S. Cl.
CPC ............ *B23P 19/027* (2013.01); *B25B 27/10* (2013.01); *F16L 13/146* (2013.01); *F16L 33/2076* (2013.01)

(58) Field of Classification Search
USPC .......................................................... 72/312
See application file for complete search history.

(56) References Cited

U.S. PATENT DOCUMENTS

| | | | | |
|---|---|---|---|---|
| 6,823,573 | B2* | 11/2004 | Morrison | B25B 27/10 29/237 |
| 7,155,790 | B2* | 1/2007 | Palejwala | B25B 27/10 29/237 |
| 7,805,823 | B2 | 10/2010 | Sembritzky et al. | |
| 7,984,538 | B2* | 7/2011 | McKay | B21D 39/046 29/237 |
| 8,256,079 | B2* | 9/2012 | Hwang | B21D 39/046 29/237 |
| 8,272,128 | B2* | 9/2012 | Chawgo | H01R 43/0427 29/846 |
| 9,604,273 | B1* | 3/2017 | Hogan | B21D 39/046 |
| 2003/0167614 | A1 | 9/2003 | Morrison et al. | |
| 2005/0081359 | A1 | 4/2005 | Palejwala et al. | |
| 2007/0163101 | A1 | 7/2007 | Sembritzky et al. | |
| 2009/0300917 | A1 | 12/2009 | Hwang | |

FOREIGN PATENT DOCUMENTS

| | | |
|---|---|---|
| JP | H02-182329 A | 7/1990 |
| JP | H09-501224 A | 2/1997 |
| JP | H10-511897 A | 11/1998 |
| JP | 2875889 B2 | 1/1999 |

OTHER PUBLICATIONS

PCT/IB/373, "International Preliminary Report on Patentability for International Application No. PCT/JP2014/050885," dated Jul. 28, 2015.
PCT/ISA/237, "Written Opinion of the International Searching Authority for International Application No. PCT/JP2014/050885," dated Apr. 22, 2014.
PCT/IB/326, "Notification Concerning Transmittal of International Preliminary Report on Patentability for International Application No. PCT/JP2014/050885," dated Aug. 6, 2015.
Japan Patent Office, "Decision to Grant a Patent for Japanese Patent Application No. 2013-011302," dated Jan. 4, 2017.
China Patent Office, "Office Action for Chinese Patent Application No. 201480005110.5," dated Apr. 21, 2016.
PCT/ISA/210, "International Search Report for PCT/JP2014/050885", dated Jan. 20, 2014.
Europe Patent Office, "Partial Search Report for European Patent Application No. 14743419.5," dated Sep. 9, 2016.

* cited by examiner

SWAGE APPARATUS AND SWAGE METHOD

TECHNICAL FIELD

The present invention relates to a swage apparatus and a swage method.

BACKGROUND ART

A coupling is used to connect two tubes to each other. In connecting, an end of each tube is inserted in the coupling. After the insertion, the coupling is caulked (swaged). Thereby, two tubes are connected via the coupling.

The coupling which is to be swaged by moving a ring-shaped member along the axial direction is known. Such a coupling includes a circular cylindrical sleeve (a first member), and a swage ring (a second member). A tapered portion is formed at an end portion of the sleeve. In the tapered portion, the outer diameter of the sleeve becomes smaller closer to the distal end. The swage ring is arranged coaxially with the sleeve. In connecting tubes, firstly, an end of each tube is inserted in the sleeve. Next, the swage ring is moved with respect to the sleeve along the axial direction. More specifically, the swage ring is relatively moved such that the tapered portion passes through the swage ring. Thereby, the sleeve is compressed at the tapered portion, and the tube is swaged.

In relation to the above, Patent Literature 1 (JP H09-501224 A) discloses an attachment component which is to be attached to the tube by swaging. This attachment component includes a circular cylindrical sleeve. The sleeve has a tapered outer surface, and an inner surface for receiving the tube. When the swaging ring engages the outer surface of the sleeve and the ring moves in a forward direction along the axis with respect to the sleeve, the ring applies a radial force to the sleeve and the sleeve is swaged.

On the other hand, in swaging the coupling, a swage apparatus is used. Relatedly, in Patent Literature 2 (JP H02-182329 A), a swaging tool is disclosed. This swaging tool includes a first die, a second die that is movable toward the first die, a head for holding the first die with respect to the second die during swaging, and a cylinder for supporting the second die which has a means for moving the second die toward the first die.

Moreover, in Patent Literature 3 (Japan Patent No. 2,875,889), the swage tool is disclosed. This swage tool includes a housing, a piston movable in the axial direction with respect to the housing, a first engaging member fixed on the housing and restricting a movement of one of the ring or the sleeve along the axial direction, and a second engaging member coupled to the piston so as to move with the piston and which moves the other of the ring or the sleeve along the axial direction toward the first engaging member.

Furthermore, in Patent Literature 4 (JP H10-511897 A), an axial swage tool having a stabilizing pin is disclosed.

CITATION LIST

Patent Literature

Patent Literature 1: Japanese Patent Application Publication JP H09-501224 A
Patent Literature 2: Japanese Patent Application Publication JP H02-182329 A
Patent Literature 3: Japan Patent No. 2,875,889
Patent Literature 4: Japanese Patent Application Publication JP H10-511897 A

SUMMARY OF THE INVENTION

In swaging the coupling, it is important that the axis of the coupling is not deviated. When the axis is deviated, the force is not applied in the proper direction. As a result, the sleeve cannot be uniformly compressed, and there may be a case in which characteristics such as airtightness required for the coupling cannot be maintained.

Accordingly, an object of the present invention is to provide a swage apparatus and a swage method which can prevent the deviation of the axis.

A swage apparatus according to the present invention is a swage apparatus for swaging the coupling. The coupling includes: a first member having a circular cylindrical shape in which an end of a tube is inserted; and a second member having a ring shape and disposed coaxially with the first member. The coupling can be swaged by moving the second member with respect to the first member along an axis of the coupling. The swage apparatus includes: a main body for supporting the coupling such that the axis of the coupling is oriented in a first direction; a stopper which comes into contact with one member of the first member or the second member and restricts a movement of the one member in the first direction; a pusher which comes into contact with the other member of the first member or the second member and pushes the other member in the first direction; and a cover member which covers the coupling so as to prevent a deviation of the axis of the coupling.

Another swage apparatus according to the present invention is a swage apparatus for swaging the coupling. The coupling includes: a first member having a circular cylindrical shape in which an end of a tube is inserted; and a second member having a ring shape and disposed coaxially with the first member. The coupling can be swaged by moving the second member with respect to the first member along an axis of the coupling. The swage apparatus includes: a main body for supporting the coupling such that the axis of the coupling is oriented in a first direction; a stopper which comes into contact with one member of the first member or the second member and restricts a movement of the one member in the first direction; a pusher which comes into contact with the other member of the first member or the second member and pushes the other member in the first direction; and an axis detecting unit which detects whether or not the axis of the coupling and an axis of the tube are along the first direction.

A swage method according to the present invention includes: supporting a coupling such that an axis of the coupling is oriented in a first direction; restricting a movement of one member of the first member or the second member in the first direction; pushing the other member of the first member or the second member in the first direction; and covering the coupling with a cover member so as to prevent a deviation of the axis of the coupling.

According to the present invention, the swage apparatus and swage method are provided with which it is possible to prevent the deviation of the axis.

DESCRIPTION OF EMBODIMENTS

Figure 1:
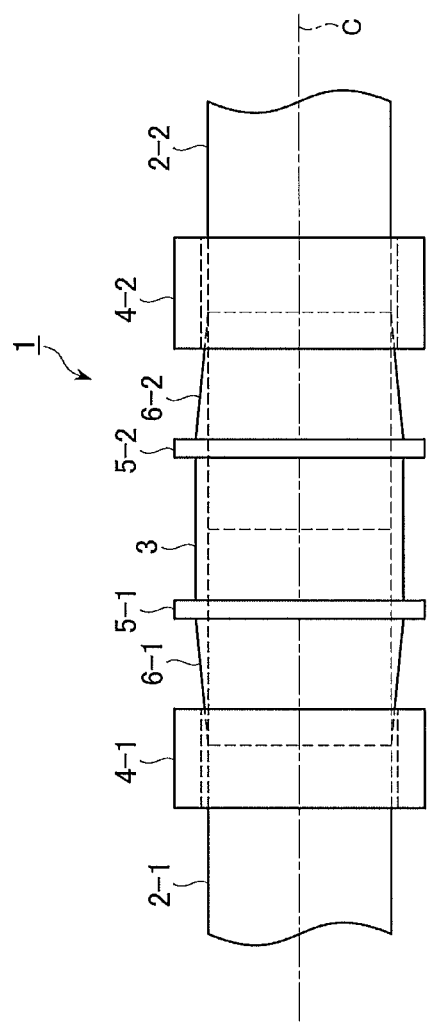
FIG. 1 is a schematic diagram for indicating the coupling.

Referring to the drawings, embodiments will be explained.

First Embodiment

At first, the first embodiment will be explained. FIG. 1 is the schematic diagram for indicating the coupling 1 to be swaged by the swage apparatus according to the present embodiment. Firstly, the coupling 1 will be explained.

The coupling 1 is used for connecting a tube 2-1 and a tube 2-2. In the present embodiment, it is supposed that the tube 2-1 and the tube 2-2 are tubes to be disposed in an aircraft. As shown in FIG. 1, the coupling 1 includes a sleeve 3 (a first member) and a pair of swage rings (4-1, 4-2; second members).

The sleeve 3 has a cylindrical shape having the same diameter. In the sleeve 3, an end of each tube 2 is inserted. At both ends of the sleeve 3, tapered portions 6 (6-1 and 6-2) are formed. In each tapered portion 6, the outer diameter of the sleeve 3 is smaller closer to the tip side. In addition, the sleeve 3 has a pair of stoppers 5 (5-1, 5-2). Each stopper 5 is provided to restrict a movement of corresponding swage ring 4. Each stopper 5 is formed at the proximal end of corresponding tapered portion 6.

The pair of swage rings 4 is arranged on both the distal end portions of the sleeve 3, respectively. Each swage ring 4 has a ring shape and is disposed coaxially with the sleeve 3. In each swage ring 4, the end portion of the sleeve 3 is inserted. An inner diameter of each swage ring 4 is greater than an outer diameter of the tip portion of the tapered portion 6, and is smaller than an outer diameter of the proximal portion of the tapered portion 6.

In swaging the coupling 1, each swage ring 4 is moved with respect to the sleeve 3 along the axis c of the coupling. In some cases each swage ring 4 is moved while the sleeve 3 is in a state of being fixed, and in some cases the sleeve 3 is moved while each swage ring 4 is in a state of being fixed. Each swage ring 4 is pushed until it comes into contact with the corresponding stopper 5. Thereby, the sleeve 3 is compressed at the tapered portion 6, and each tube 2 inserted is tightened. In other words, the coupling 1 is swaged.

Subsequently, the swage apparatus for swaging the coupling 1 will be explained. Firstly, outline of the swage apparatus will be explained.

Figure 2:
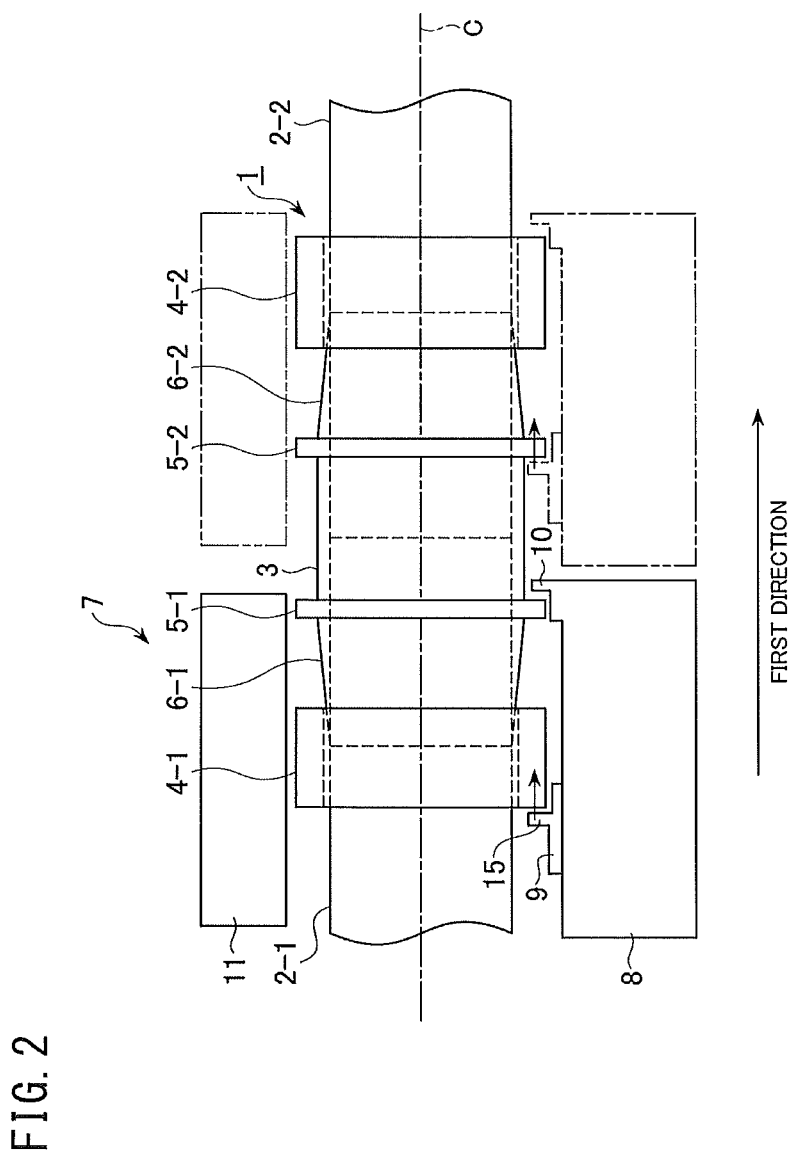
FIG. 2 is a diagram for schematically indicating a configuration of the swage apparatus.

FIG. 2 is the diagram for schematically indicating the configuration of the swage apparatus 7. As shown in FIG. 2, the swage apparatus 7 includes a main body 8, a stopper 10, a yoke (a pusher) 9 and a cover member 11. In addition, a first direction is set relating to the swaging apparatus 7. The first direction is a direction in which the yoke 9 pushes the swage ring 4 or the stopper 5.

On the main body 8, the coupling 1 in which the tube has been inserted is disposed. The coupling 1 is disposed such that the axis c of the coupling 1 orients to the first direction.

The stopper 10 is provided with the main body 8 so as to protrude from the main body 8. The stopper 10 comes into contact with the swage ring 4 or the stopper 5, and restricts a movement of the swage ring 4 or the stopper 5 (the sleeve 3) in the first direction.

The yoke 9 is disposed on the main body 8 so as to be movable along the first direction. The york 9 has a function as the pusher. That is, the yoke 9 comes into contact with the other of the swage ring 4 or the stopper 5, and has a function to push the swage ring 4 or the sleeve 3 along the first direction.

By pushing the swage ring 4 or the sleeve 3 by the yoke 9, the swage ring 4 is moved relative to the sleeve 3, and the coupling 1 is swaged. In FIG. 2, the arrangement in the case that the yoke 9 pushes the swage ring 4-1 is shown by a solid line. On the other hand, the arrangement in the case that the yoke 9 pushes the stopper 5-2 is shown by a dotted line. For example, by pushing the swage ring 4-1 by the yoke 9, one end of the coupling 1 (the tapered portion 6-1) is swaged (see the solid line in FIG. 2). Then, as indicated by the dotted line, the position of the coupling 1 is changed, and the stopper 5-2 is pushed. Thereby, the other end of the coupling 1 (the tapered portion 6-2) is swaged. As a result, the pair of tubes (2-1, 2-2) is connected via the coupling 1.

Note that there is a case in which the coupling 1 separates from the swage apparatus 7 if the coupling 1 is not restricted at the upper side, for example, the coupling is movable in an upward direction of FIG. 2. There is a case in which a force is not properly applied to the tapered portion 6 since the axis c of the coupling is deviated from the first direction during pushing. Therefore, according to the present embodiment, the cover member 11 is provided. The cover member 11 is disposed to cover the coupling 1. During pushing, the cover member 11 prevents the axis c of the coupling 11 from being deviated. Thereby, it is possible to properly compress the tapered portion 6, and it is possible to properly swage the coupling 11.

The configuration of the swage apparatus 7 will be explained in more detail below.

Figure 3:
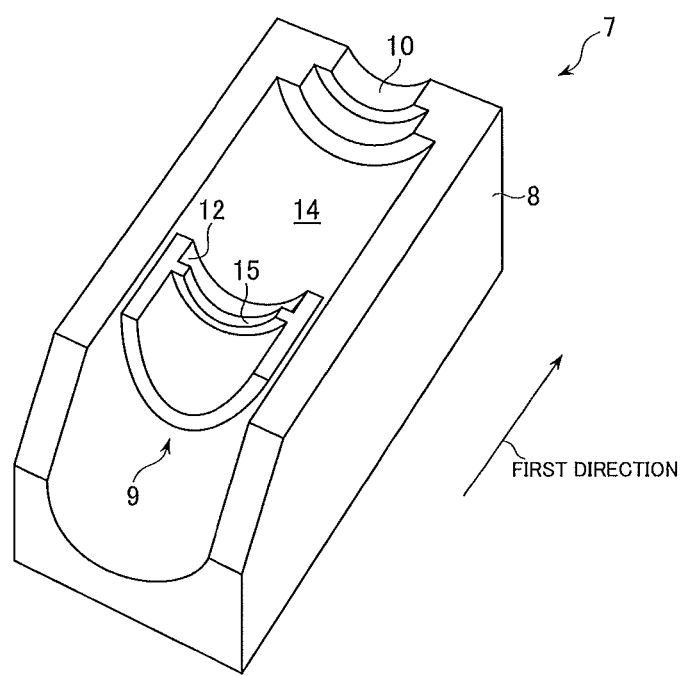
FIG. 3 is a perspective diagram for indicating the swage apparatus.

FIG. 3 is the perspective diagram for indicating the swage apparatus 7. Note that, for convenience of explanation, illustration of the cover member 11 is omitted in FIG. 3.

As shown in FIG. 3, in the upper surface of the main body 8, a channel is formed such that the coupling 1 and the tube 2 can be placed thereon. With this channel, sliding surface 14 is formed. The sliding surface 14 is a curved surface, and extends along the first direction. More specifically, when viewed along the first direction, the sliding surface 14 (the channel) has an arc shape.

The yoke 9 is disposed on the sliding surface 14. The yoke 9 is supported by the main body 8. Moreover, the yoke 9 is movable on the sliding surface 14 along the first direction. For example, inside the main body 8, a cylinder (not shown) and a piston (not shown) are provided. In this case, the yoke 9 is connected to the piston (piston rod) in the main body 8 using an opening (not shown) provided in the sliding surface 14. Thereby, the yoke 9 is supported so as to be movable along the first direction.

In addition, the York 9 has a shape not to interfere with the coupling 1 and the tube 2. That is, when viewed along the first direction, the yoke 9 has an arc shape.

Moreover, the yoke 9 has a mounting surface 12 and a stopper 15. On the mounting surface 12, a part of the coupling 1 (the swage ring 4 or the stopper 5) is placed. The stopper 15 is a portion which pushes the swage ring 4 or the stopper 5 (see FIG. 2). During pushing, the stopper 15 comes into contact with the swage ring 4 or the stopper 5 at a first direction side.

The stopper 10 is located at the end portion of a first direction side of the sliding surface 14. As described above, the stopper 10 restricts the swage ring 4 or the sleeve 3 from moving in the first direction.

Figure 4:
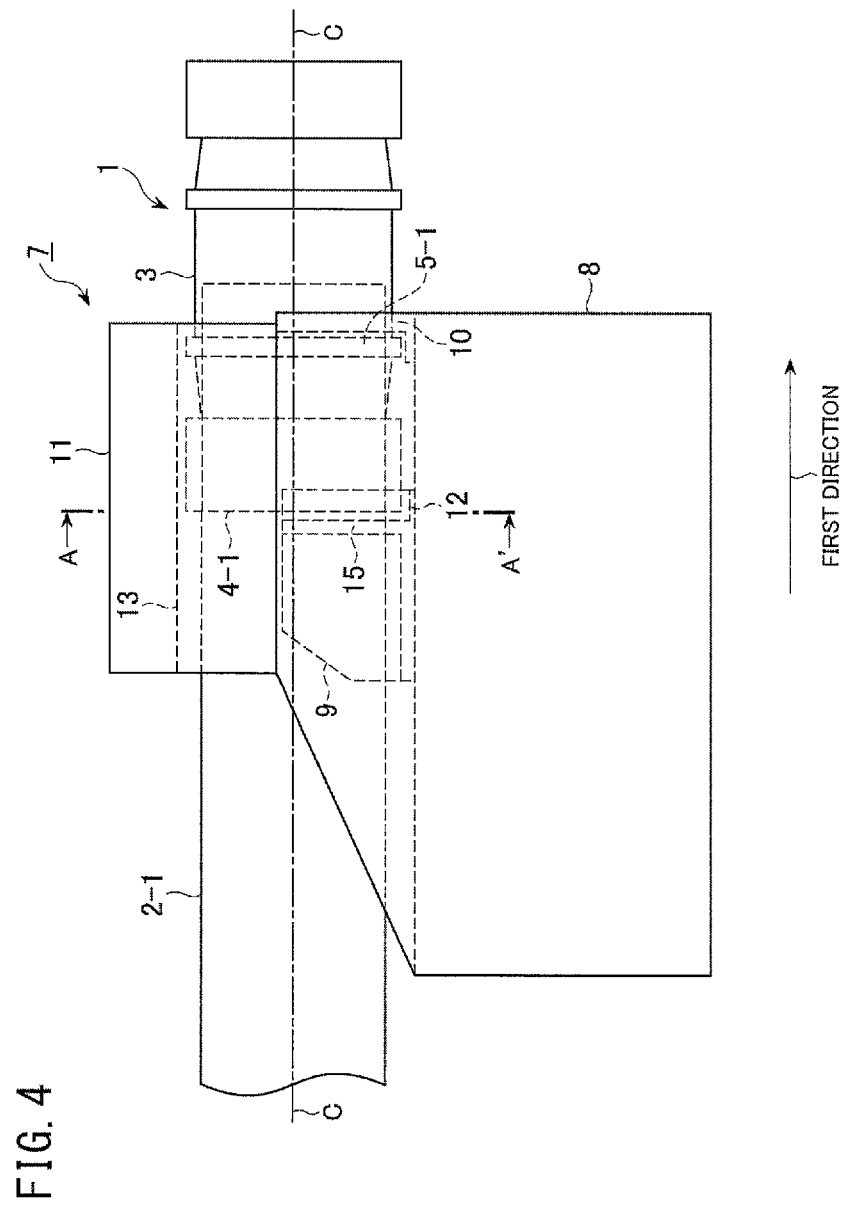
FIG. 4 is a diagram when viewing the swage apparatus from the side.

Subsequently, the cover member 11 will be explained. FIG. 4 is the diagram when viewing the swage apparatus from the side. As shown in FIG. 4, the cover member 11 is disposed so as to cover the upper surface of the main body 8. That is, the cover member 11 is disposed so as to cover a part of the coupling 1 (the swage ring 4 and the stopper 5).

Figure 5:
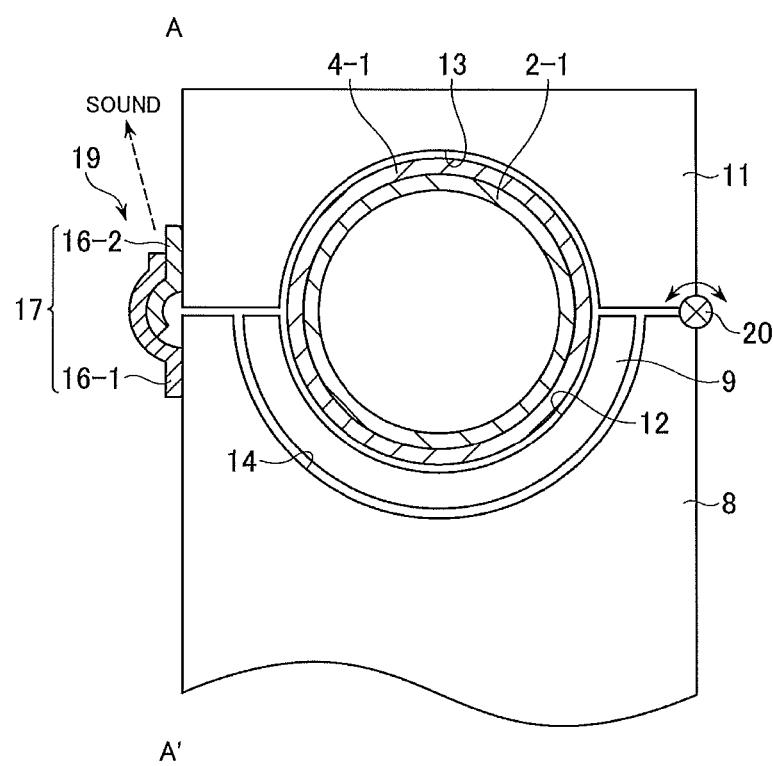
FIG. 5 is a cross sectional view taken along AA' in FIG. 4.

FIG. 5 is the cross sectional view taken along AA' in FIG. 4 for indicating a configuration of the yoke 9 and the cover member 11.

As shown in FIG. 5, the sliding surface 14 of the main body 8 has a semicircular shape when viewed from a direction along the first direction. The yoke 9 is also arcuate-shape. More specifically, when viewed along the first direction, the mounting surface 12 of the yoke 9 has a shape corresponding to a region of the outer circumference of the coupling 1 (the swage ring 4 or the stopper 5). More specifically, when viewed along the first direction, the mounting surface 12 has a semicircular shape.

In addition, the cover member 11 includes a cover surface 13. The cover surface 13 also has an arc shape when viewed along the first direction. The cover surface 13 comes into contact with another region of the outer circumference of the coupling 1. More specifically, when viewed along the first direction, the cover surface 13 has a semicircular shape.

As shown in FIG. 5, when viewed along the first direction, the lower half of the coupling 1 (the swage ring 4-1) is covered with the yoke 9, and the upper half of the coupling 1 (the swage ring 4-1) is covered with the cover member 11. Since the entire circumference of the coupling 1 is covered with the yoke 9 and the cover member 11, the deviation of the axis c of the coupling 1 at the time of pushing can be reliably prevented.

In addition, the cover member 11 is attached to the main body 8 so as to be openable and closable. As shown in FIG. 5, the cover member 11 is connected to the main body 8 via a connecting member 20. The connecting member 20 connects the cover member 11 to the main body 8 such that the cover member 11 can rotate about an axis parallel to the first direction. Note that it is possible to use, for example, a hinge as the connecting member 20.

Furthermore, as shown in FIG. 5, on the cover member 11 and the main body 8, a fixing mechanism 17 is installed. The fixing mechanism 17 has a function of fixing the cover member 11 to the main body 8 when the cover member 11 is in a closed state. In the example shown in FIG. 5, the fixing mechanism 17 includes an engaging member 16-1 and an engaging member 16-2. The engaging member 16-1 is mounted on the main body 8. The engaging member 16-2 is mounted on the cover member 11, and is configured to engage the engaging member 16-1 when the cover member 11 becomes to the closed state.

Moreover, the swage apparatus 7 includes a first alert section 19. The first alert section 19 has a function to inform an operator that it is in the closed state. In the present embodiment, the first alert section 19 is realized by the fixing mechanism 17. That is, the engaging member 16-1 and the engaging member 16-2 are configured to emit a sound when these are engaged. The operator can recognize that the engaging member 16-1 and the engaging member 16-2 have been engaged by listening to the sound, and confirm the swage apparatus 7 is in the closed state.

Figure 6:
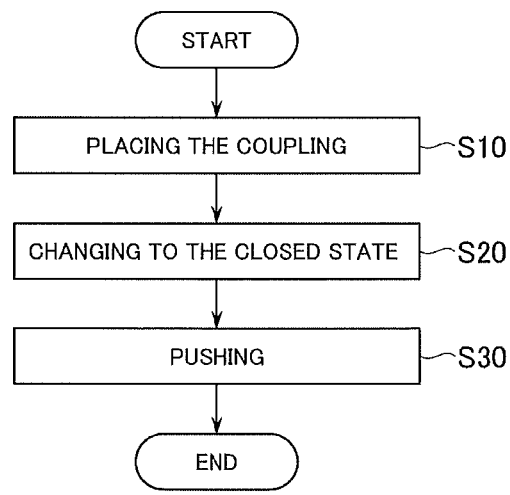
FIG. 6 is a flowchart for indicating the swage method.

Next, the swage method will be explained. FIG. 6 is the flowchart for indicating the swage method according to the present embodiment.

Step S10: Placing the Coupling

Firstly, the end of each tube 2 is inserted into the end portion of the coupling 1 (the sleeve 3). Then, the coupling 1 is placed on the swage apparatus 7 which is in an open state. In placing, the coupling 1 is placed such that the axis c is along the first direction. In addition, the coupling 1 is placed such that the swage ring 4 and the stopper 5 are located between the stopper 15 and the stopper 10.

Step S20: Changing to the Closed State

Next, the cover member 11 is rotated, and the coupling 1 is covered. That is, the swage apparatus 7 is changed to the closed state. The cover member 11 is fixed to the main body 8 by the fixing mechanism 17.

Step S33: Pushing

Next, the york 9 is moved along the first direction. Thereby, the swage ring 4 or the sleeve 3 is pushed until the swage ring 4 comes into contact with the stopper 5. As a result, the tapered portion 6 (see FIG. 1) is compressed, and one tube of the pair of tubes 2 is tightened. In other words, the coupling 1 is swaged.

Similarly, regarding the other tube 2, the coupling 1 is swaged by repeating the process of steps S1 to S3. Thus, the pair of tubes 2 is connected via the coupling 1.

As explained above, according to the present embodiment, the cover member 11 is provided. Therefore, it is possible to enhance a contact degree between the coupling 1 and the swaging apparatus 7, and possible to prevent the axis c of the coupling 1 from being displaced during pushing. Thereby, it is possible to uniformly compress the coupling 1, and properly connect the pair of tubes 2.

In addition, according to the present embodiment, since the fixing mechanism 17 (see FIG. 5) is provided, a movement of the cover member 11 is prevented during pushing. Thereby, it is possible to reliably prevent the axis of the coupling 1 from being deviated.

Furthermore, according to the present embodiment, the first alert section 19 (see FIG. 5) is provided. For example, when connecting the pipes to each other to be used for the aircraft, work in dark environment is inevitable. Therefore, it is difficult for the operator to confirm whether or not it is in the closed state. In contrast, in the present embodiment, the operator is informed from the first alert portion 19 that it is in the closed state. Therefore, the operator can recognize whether or not it is in the closed state even in the dark environment, and working errors are prevented.

Note that, according the present embodiment, the case in which the pair of tubes 2 is the pipes used for the aircraft has been explained. For the pipes used for the aircraft, high airtightness (or water tightness) is required. Also, the pipes used for the aircraft are often to be arranged in a narrow portion. Therefore, there are many cases in which the operator cannot perform the connecting work in a free attitude. Furthermore, as described above, the operator is often forced to work in the dark environment. Therefore, it is difficult to operate the swage apparatus 7 such that the axis is not deviated. In contrast, according to the present embodiment, since it is possible to prevent the deviation of the axis c, it is possible to connect the pipes in the narrow portion to each other while maintaining the high airtightness. However, a use of the swage apparatus 7 is not limited to above mentioned use.

Further, according the present embodiment, the case in which the cover member 11 is attached to the main body 8 via the connecting member 20 has been explained (see FIG. 5). However, the cover member 11 may be attached to the main body 8 via another mechanism as long as the cover member 11 is openable and closable. For example, if magnets (magnetic material) are mounted on the main body 8 and the cover member 11, respectively, it is possible to attach the cover member 11 to the main body so as to be openable and closable. Alternatively, the cover member 11 may be attached to the main body 8 such that the cover member 11 is slidable along the first direction.

Further, according the present embodiment, the case in which the pair of engagement members (16-1, 16-2) is used as the fixing mechanism 17 has been explained. However, it is possible to use another mechanism as the fixing mechanism 17. For example, it is possible to use magnets attached to the main body 8 and the cover member 11 as the fixing mechanism 17.

Furthermore, according the present embodiment, the case in which the pair of engagement members (16-1, 16-2) emitting the sound is used as the first alert section 19 has been explained. However, it is possible to use another mechanism as the first alert section 19. For example, it is possible that the first alert section 19 is configured to use light for informing the operator that it is in the closed state.

Second Embodiment

Figure 7:
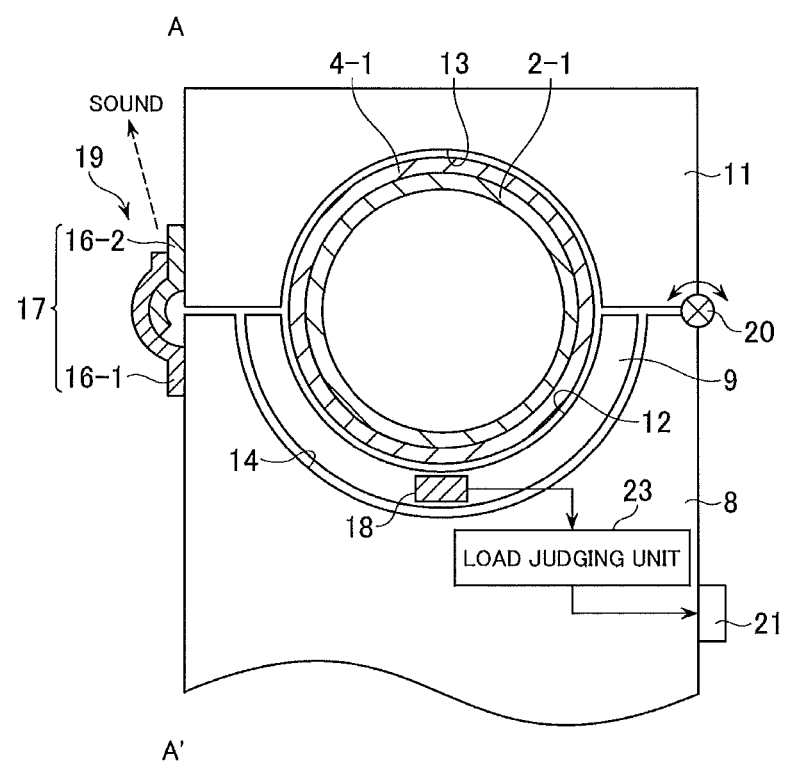
FIG. 7 is a schematic diagram for indicating the swage apparatus according to the second embodiment.

Next, the second embodiment will be explained. FIG. 7 is the schematic diagram for indicating the swage apparatus 7 according to the present embodiment. As shown in FIG. 7, in the present embodiment, a pressure sensor 18, a load judging unit 23, and an alert section 21 are added as compared to the first embodiment. For other points, as it is possible to adopt the same configuration as the first embodiment, detailed explanation thereof will be omitted.

The pressure sensor 18 is attached to the mounting surface 12 of the yoke 9, and has a function of measuring a load (pressure) applied from the coupling 1 (the swage ring 4 or the sleeve 3) to the yoke 9. It is possible to use, for example, a strain gauge, a piezoelectric element etc. as the pressure sensor 18.

The load judging unit 23 judges whether or not the load applied to the coupling 1 is appropriate by comparing a measurement result of the pressure sensor 18 with a predetermined set value. In other words, the load judging unit 23 judges whether or not a force with which the coupling 1 is pushed against the swage apparatus 7 is appropriate.

The alert portion 21 is provided to inform the operator a judgment result of the load judging unit 23. The operator can judge whether or not the force for pushing the coupling 1 is appropriate using the alert section 21. It is possible to use, for example, a light-emitting mechanism, a sound emitting mechanism etc. as the alert section 21. By using these mechanisms, it is possible for the operator to recognize the judgment result even in the dark environment.

According to the present embodiment, the load judging unit 23 judges whether or not the force with which the coupling 1 is pushed against the swaging apparatus 7 is appropriate. In swaging the coupling 1, it is important that the axis of the coupling 1 and an axis of the tube 2 are coincidence with each other. In order to match the axis of the coupling 1 with the axis of the tube 2, there is a case in which the operator push the coupling 1 against the swage apparatus 7 with an excessive force. In such a case, on the contrary, the axis c of the coupling 1 is likely to be deviated. On the other hand, according to the present embodiment, it is possible to confirm whether or not the coupling 1 is too much pushed (whether or not the excessive force is applied to the swage apparatus 7 via the coupling 1). Thereby, it is possible to more reliably prevent the deviation of the axis c at the time of swaging.

Moreover, if the cover member 11 is forced in the closed state under the condition in which the axis c is deviated from the first direction, the load applied from the coupling 1 to the swage apparatus 7 becomes different value from that of the normal state. Therefore, it is possible to confirm whether or not the axis c is deviated from the first direction by judging whether or not the load applied from the coupling 1 to the swage apparatus 7 is appropriate using the load judging unit 23.

Note that it is not absolutely necessary that the pressure sensor 18 is attached to the mounting surface 12 as long as the pressure sensor 18 is configured to detect the load applied from the coupling 1 to the swage apparatus 7. For example, it is possible that the pressure sensor 18 is attached to the sliding surface 14.

Third Embodiment

Figure 8:
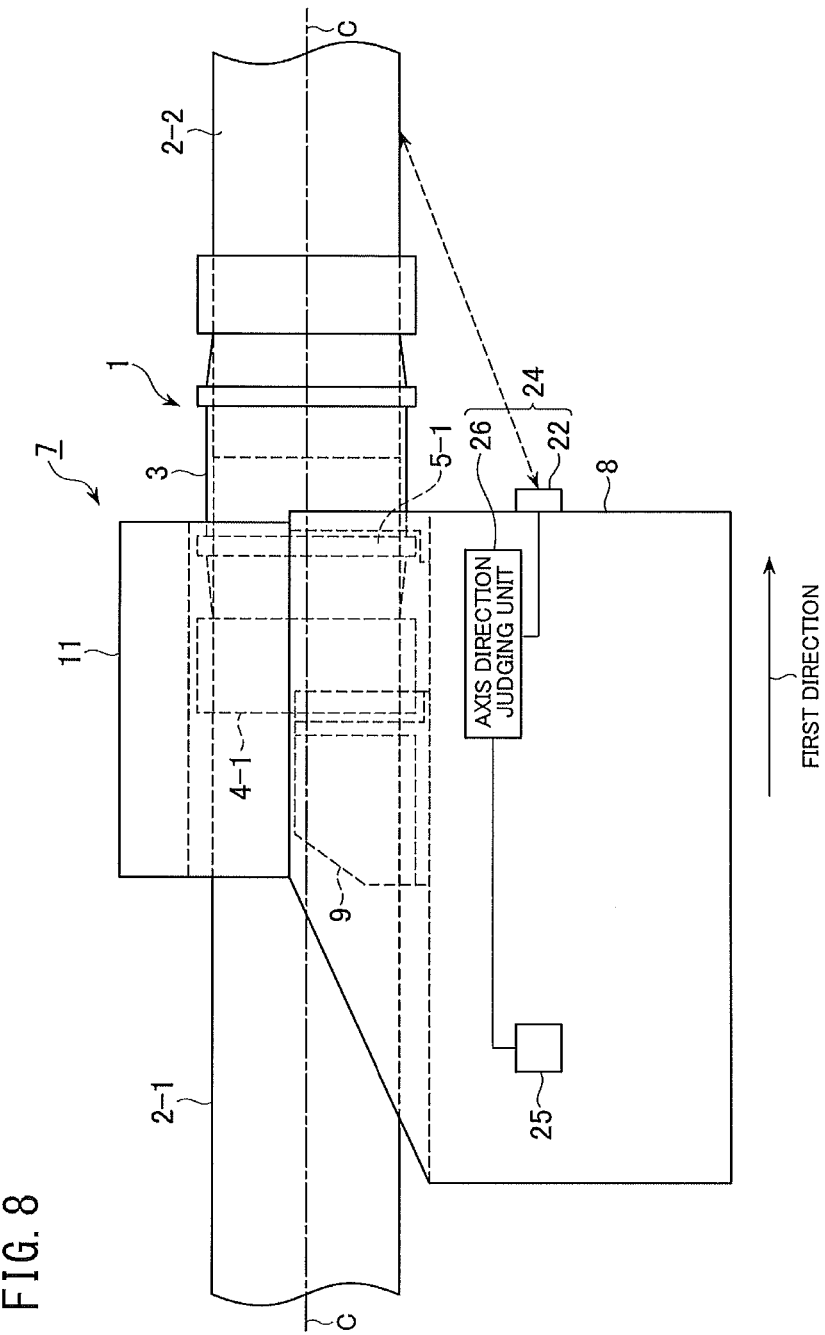
FIG. 8 is a schematic diagram for indicating the swage apparatus according to the third embodiment.

Next, the third embodiment will be explained. FIG. 8 is the schematic diagram for indicating the swage apparatus 7 according to the present embodiment. In the present embodiment, an axis detecting unit 24, and an alert section 25 (a second alert section) is added as compared to the above mentioned embodiments. For other points, since it is possible to adopt the same configuration as above mentioned embodiments, detailed explanation thereof will be omitted.

The axis detecting unit 24 has a function of detecting whether or not the axis of the coupling 1 coincides with the axis of the tube 2. More specifically, an axis judging unit 26 has a function of judging whether or not the axis of the coupling 1 and tube 2 coincides with the first direction. More specifically, regarding the tube 2 inserted into the other side opposite to a swage side, the axis judging unit 26 detects whether or not the axis of the coupling 1 coincides with the axis of the tube 2.

The axis detecting unit 24 includes an optical sensor 22 and the axis judging unit 26.

The optical sensor 22 is attached to a side surface of the main body 8. The optical sensor 22 has a function of measuring a distance between the optical sensor 22 and the tube 2 in a predetermined direction.

The axis judging unit 26 has a function of judging whether or not the axis of the coupling 1 coincides with the axis of the tube 2 based on a measurement result of the optical sensor 22.

The alert section 25 has a function of informing the operator a judgment result of the axis judging unit 26. The operator can judge whether or not the axis of the coupling 1 coincides with the axis of the tube 2 using the alert section 25. Note that it is possible to use, for example, a light-emitting mechanism, a sound-emitting mechanism etc. as the alert section 25. By using these mechanisms, the operator can recognize the judgment result even in the dark environment.

Figure 9:
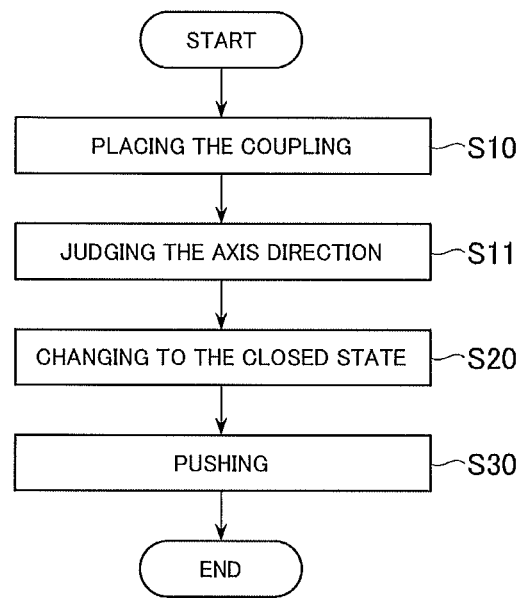
FIG. 9 is a flowchart for indicating the swage method.

Subsequently, the swage method according to the present embodiment will be explained. FIG. 9 is the flowchart for indicating the swage method. In the present embodiment, judging step (step S11) for judging whether or not the axis of the coupling 1 coincides with the axis of the tube 2 is added as compared to the first embodiment (see FIG. 6). That is, firstly, the coupling 1 is placed on the swage apparatus 7 (step S10) as in the first embodiment. Next, it is confirmed whether or not the axis of the coupling 1 coincides with the axis of the tube 2 using the axis detecting unit 24 (step S11). In the case that these are coincidence with each other, the coupling 1 is covered with the cover member 11 and the swage apparatus 7 is changed in the closed state (step S20). Then, the swage ring 4 or the sleeve 3 (stopper 5) is pushed by the yoke 9 and the coupling 1 is swaged (step S30).

Next, effects of the present embodiment will be explained.

There is a case in which the coupling 1 is strongly pushed against the swage apparatus 7 when, for example, the coupling 1 is placed on the swage apparatus 7. As a result, there is a case in which the axis of the coupling 1 is deviated from the axis of the tube 2. In particular, if a portion of the other side of the coupling 1 opposite to the swage side is in a non-swaged state, the axis of the tube 2 is likely to be deviated. Moreover, if the cover member 11 is used, a moving direction of the coupling 1 is restricted during swaging the coupling 1. Therefore, when the coupling 1 is covered with the cover member 11 under the condition in which the axis of the coupling 1 is deviated from the axis of the tube 2, the excessive force is likely to be applied to the coupling 1 and the tube 2. As a result, the coupling 1 and the tube 2 are likely to be damaged. In addition, the pair of tubes 2 is not properly connected to each other. On the other hand, according to the present embodiment, the axis detecting unit 24 can detect whether or not the axis of the coupling 1 and the axis of the tube 2 coincide with each other. Then, it is possible to cover the coupling 1 with the cover member 11 under the condition in which the axis of the coupling 1 and the axis of the tube 2 coincide with each other. It prevents the coupling 1 from being swaged under the condition in which these axes are not coincidence with each other, and it reliably prevents the coupling 1 and the tube 2 from being damaged.

Note that, in the present embodiment, the case in which the cover member 11 is provided has been explained. However, even if the cover member 11 is not provided, it is effective to provide the axis detecting unit 24. Even when the cover member 11 is not provided, it is possible to swage the coupling 1 after confirming that the axis of the coupling 1 and the axis of the tube 2 are coincidence with each other. Therefore, an effect that the coupling 1 can be properly swaged is obtained.

As described above, regarding the present invention, the explanation has been done using the first embodiment to the third embodiment. However, these embodiments are not absolutely necessary to be independent to each other. It is also possible to combine these embodiments as long as the technical contradiction does not occur. For example, by combing the second embodiment and the third embodiment, both the pressure sensor 18 and the axis detecting unit 24 may be provided to the swage apparatus.

It should be noted that this application claims a priority based on Japan Patent Application No. JP 2013-011302, and the disclosure thereof is incorporated herein by reference.

The invention claimed is:

1. A swage apparatus for swaging a coupling, the coupling including a first member having a circular cylindrical shape in which an end of a tube is inserted and a second member having a ring shape and disposed coaxially with the first member, wherein the coupling is capable of being swaged by moving the second member with respect to the first member along an axis of the coupling, the apparatus comprising:
 a main body for supporting the coupling such that an axis of the coupling is oriented in a first direction;
 a stopper configured to come into contact with one member of the first member or the second member and restrict a movement of the one member in the first direction;
 a pusher configured to come into contact with the other member of the first member or the second member and push the other member in the first direction; and
 a cover member configured to cover the coupling so as to prevent a deviation of the axis of the coupling,
 wherein the main body includes an upper surface,
 wherein the upper surface has a channel extending along the first direction,
 wherein the channel has an arc shape when viewed along the first direction,
 wherein the pusher is disposed in the channel and has an arc shape when viewed along the first direction,
 wherein the cover member has a cover surface covering the coupling disposed on the channel, and
 wherein the cover surface has an arc shape when viewed along the first direction.

2. The swage apparatus according to claim 1, wherein the pusher has a semicircular shape when viewed along the first direction, and
 wherein the cover surface has a semicircular shape when viewed along the first direction.

3. The swage apparatus according to claim 1, wherein the cover member is openably and closably attached to the main body.

4. The swage apparatus according to claim 3, further comprising:
 a fixing mechanism configured to fix the cover member to the main body when the cover member is in a closed state.

5. The swage apparatus according to claim 3, further comprising:
 a first alert section configured to inform an operator whether or not the cover member is in a closed state.

6. The swage apparatus according to claim 1, further comprising:
 a pressure sensor configured to detect a pressure applied from the coupling to the swage apparatus; and
 a load judging unit configured to judge whether or not an excessive force is applied to the coupling based on a detection result of the pressure sensor.

7. The swage apparatus according to claim 1, further comprising:
 an axis detecting unit configured to detect whether or not the axis of the coupling is coincidence with an axis of the tube.

8. The swage apparatus according to claim 7, wherein the axis detecting unit includes:
 an optical sensor attached to the main body and configured to measure a distance between the tube and the optical sensor; and
 an axis judging unit configured to detect whether or not the axis of the coupling is coincidence with the axis of the tube based on a detection result of the optical sensor.

9. The swage apparatus according to claim 7, further comprising:
 a second alert section configured to inform an operator a detection result of the axis detecting unit.

10. A swage apparatus for swaging a coupling, the coupling including a first member having a circular cylindrical shape in which an end of a tube is inserted and a second member having a ring shape and disposed coaxially with the first member, wherein the coupling is capable of being swaged by moving the second member with respect to the first member along an axis of the coupling, the apparatus comprising:
- a main body for supporting the coupling such that an axis of the coupling is oriented in a first direction;
- a stopper configured to come into contact with one member of the first member or the second member and restrict a movement of the one member in the first direction;
- a pusher configured to come into contact with the other member of the first member or the second member and push the other member in the first direction; and
- an axis detecting unit configured to detect whether or not the axis of the coupling and an axis of the tube are along the first direction.

11. A swage method for swaging a coupling, the coupling including a first member having a circular cylindrical shape in which an end of a tube is inserted and a second member having a ring shape and disposed coaxially with the first member, wherein the coupling is capable of being swaged by moving the second member with respect to the first member along an axis of the coupling, the method comprising:
- supporting the coupling such that the axis of the coupling is oriented along a first direction;
- restricting a movement of one member of the first member or the second member in the first direction;
- pushing the other member of the first member or the second member in the first direction;
- covering the coupling with a cover member so as to prevent a deviation of the axis of the coupling; and
- detecting whether or not the axis of the coupling and an axis of the tube are along the first direction,
- wherein the pushing is performed when the axis of the coupling and the axis of the tube are along the first direction.

* * * * *